US006894725B2

(12) United States Patent
Hutchinson et al.

(10) Patent No.: US 6,894,725 B2
(45) Date of Patent: May 17, 2005

(54) SAMPLE RATE CONVERTER SYSTEM

(75) Inventors: Daniel Mark Hutchinson, Carmel, IN (US); Mark Francis Rumreich, Indianapolis, IN (US)

(73) Assignee: Thomson Licensing S.A., Boulogne-Billancourt (FR)

(*) Notice: Subject to any disclaimer, the term of this patent is extended or adjusted under 35 U.S.C. 154(b) by 320 days.

(21) Appl. No.: 10/190,185

(22) Filed: Jul. 5, 2002

(65) Prior Publication Data

US 2003/0103163 A1 Jun. 5, 2003

Related U.S. Application Data

(60) Provisional application No. 60/336,650, filed on Dec. 3, 2001.

(51) Int. Cl.[7] .................................................. H04N 7/01
(52) U.S. Cl. ........................ 348/441; 348/565; 348/571
(58) Field of Search ................................ 348/441, 571, 348/572, 445, 565, 566, 607; 341/61, 122–125; 358/445

(56) References Cited

U.S. PATENT DOCUMENTS 5,335,074 A * 8/1994 Stec ........................... 348/537
5,420,643 A * 5/1995 Romesburg et al. ......... 348/581
5,821,884 A * 10/1998 Lee ............................. 341/61

* cited by examiner

Primary Examiner—Victor R. Kostak
(74) Attorney, Agent, or Firm—Joseph S. Tripoli; Robert D. Shedd

(57) ABSTRACT

A digital video system includes a sample rate converter and an inverse-sample rate converter. The sample rate converter converts video data from a non-orthogonal pixel domain to an orthogonal pixel domain. The inverse-sample rate converter converts the video data from the orthogonal pixel domain to the non-orthogonal pixel domain. The inverse sample rate converter utilizes a timing signal generated by the sample rate converter when converting the video data from the orthogonal pixel domain to the non-orthogonal pixel domain.

22 Claims, 15 Drawing Sheets

SAMPLE RATE CONVERTER SYSTEM

CROSS-REFERENCE TO RELATED APPLICATION

This application claims all benefits accruing from a provisional application filed in the United States Patent and Trademark Office on Dec. 3, 2001, and there assigned Ser. No. 60/336,650.

BACKGROUND OF THE INVENTION

1. Field of the Invention

The present invention generally relates to video signal processing systems, and more particularly, to systems for eliminating undesired picture artifacts created by digital video signal processing.

2. Background Information

In digital video signal processing systems, it may be desirable to operate in various pixel domains. For example, it is often advantageous to operate in an orthogonal pixel domain where signal samples represent points on a rectangular grid. Performing on-screen display processing in the orthogonal pixel domain eliminates the need for complex skew-correction schemes to prevent jagged edges and jitter on video overlays. For certain applications such as picture-in-picture ("PIP") processing, using the orthogonal pixel domain not only eliminates such skew-correction schemes (e.g., for insert picture compression and overlay functions), but also simplifies operations such as vertical filtering. In particular, vertical filtering is often performed using a frame combing process where pixels from one field are compared with pixels from a previous field (or frame). Such a process would be extremely difficult, if not impossible, to perform outside of the orthogonal pixel domain.

In some cases, it may be desirable to convert from one domain to another. As an example, it may be desirable to convert a signal to the orthogonal pixel domain (e.g., line-locked, burst-locked) for processing, and then convert it back to the original non-orthogonal pixel domain. The different pixel domains may also be viewed as different clock domains wherein the operation in each domain is controlled by a respective clock signal at a particular frequency and exhibiting a particular timing. In the described example, the orthogonal pixel domain is an example of a first clock domain and the non-orthogonal pixel domain is an example of a second clock domain. Various clock domains are possible and may be selected in accordance with the clock domain that is convenient for the particular form of digital signal processing that is needed. An aspect of using different clock or pixel domains is that conversion between the clock domains may be necessary. For example, to convert data from the non-orthogonal pixel domain to the orthogonal pixel domain requires a variable sample rate converter ("SRC"). A variable SRC employs a conversion ratio that is continuously adjusted in order to maintain (i) a constant number of output samples per horizontal line, and (ii) a predetermined phase relationship between the output samples and horizontal synchronization signals (even as the number of input samples per line varies). Similarly, to convert data from the orthogonal pixel domain back to the non-orthogonal pixel domain requires a second variable SRC referred to herein as a variable inverse-SRC.

In certain systems, both the first SRC and second SRC, or inverse-SRC, require a phase lock loop ("PLL") in order to control the conversion ratio. In particular, the PLL controlling the SRC adjusts the conversion ratio to produce a fixed number of output samples (e.g., 858) per horizontal line. The PLL controlling the inverse-SRC adjusts the conversion ratio to produce an output sample rate that matches the sample rate at the input of the SRC. In such cases, the system transient response time is the sum of the response times of the two PLLs. Accordingly, the use of multiple PLLs often results in an extended recovery interval for horizontal transients, such as those produced by a head switching operation in a video cassette recorder ("VCR"). Moreover, using multiple PLLs requires additional circuitry, and can also introduce noise into the system. Such noise can thereby cause undesired picture artifacts to be displayed.

Accordingly, there is a need for a digital video system which avoids the aforementioned problems, and thus prevents degradation of system transient response time and noise immunity while also reducing circuitry requirements. The present invention addresses these and other issues.

SUMMARY OF THE INVENTION

The present invention involves, in part, recognizing the described problems and, in part, providing a video signal processing system for solving the described problems. More specifically, in accordance with a aspect of the present invention, a video signal processing system comprises a first sample rate converter and a second sample rate converter. The sample rate converter converts video data from a first clock domain to a second clock domain. The second sample rate converter converts the video data from the second clock domain to the first clock domain. The second sample rate converter utilizes a control signal generated by the sample rate converter when converting the video data from the second clock domain to the first clock domain.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DESCRIPTION OF THE PREFERRED EMBODIMENTS

Figure 1:
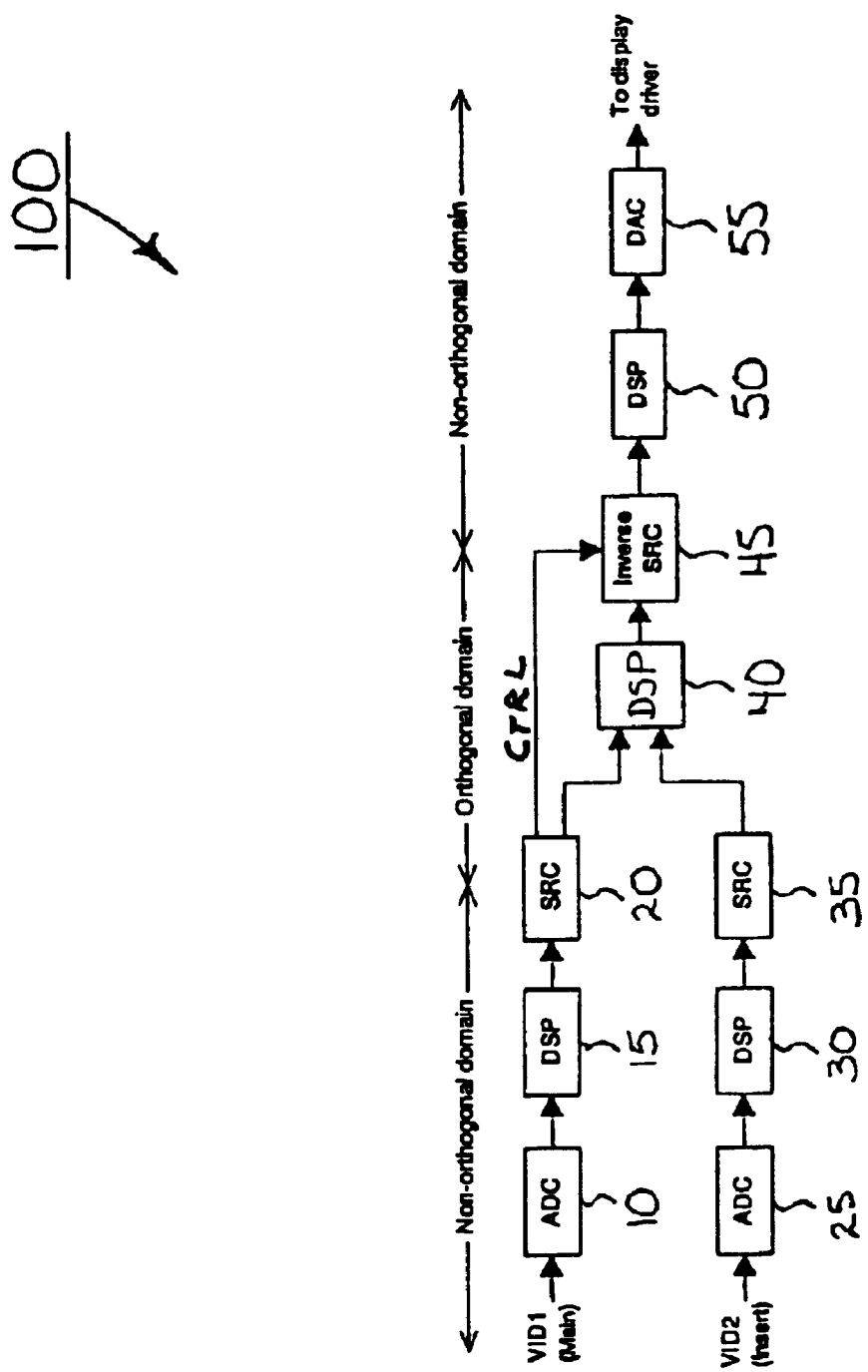
FIG. 1 illustrates a relevant portion of an exemplary digital video system suitable for implementing the present invention.

Referring now to the drawings, and more particularly to FIG. 1, a relevant portion 100 of an exemplary digital video system suitable for implementing the present invention is shown. For purposes of example and explanation, FIG. 1 is represented as a portion 100 of a video system that enables a PIP function. However, as will be discussed later herein, elements of FIG. 1 may also be used for other applications, such as graphics and/or other on-screen display ("OSD") applications. The elements of FIG. 1 may, for example, be included on one or more integrated circuits ("ICs").

FIG. 1 includes two input channels (i.e., one channel for a main picture, and one channel for an insert picture that comprises the PIP). The main picture channel processes video signals (i.e., VID1) that represent the main picture, and includes an analog-to-digital converter ("ADC") 10, a digital signal processor ("DSP") 15, and an SRC 20. The insert picture channel processes video signals (i.e., VID2) that represent the insert picture or PIP, and also includes an ADC 25, a DSP 30, and an SRC 35. Outputs from the main and insert picture channels are provided to the remaining elements of FIG. 1 which include a DSP 40, an inverse SRC 45, a DSP 50, and a digital-to-analog converter ("DAC") 55.

In operation, ADCs 10 and 25 receive video signals VID1 and VID2 in an analog format and convert the same to a digital format, respectively. The horizontal line frequencies of video signals VID1 and VID2 at the inputs to ADCs 10 and 25 may vary due to normal tolerances, such as VCR tape stretch. Accordingly, the number of samples per line at the outputs of ADCs 10 and 25 may vary. Output signals from ADCs 10 and 25 are provided to DSPs 15 and 30 which perform digital signal processing operations thereon, respectively.

Output signals from DSPs 15 and 30 are in turn provided to SRCs 20 and 35 which perform sample rate conversion operations thereon, respectively. In particular, SRCs 20 and 35 each perform a sample rate conversion operation to convert signals from a first clock domain, e.g., a non-orthogonal pixel domain to a second clock domain, e.g., an orthogonal pixel domain (e.g., line-locked, burst-locked). In order to convert signals to the orthogonal pixel domain, SRCs 20 and 35 must each adapt to the instantaneous line frequency of the signals, which typically requires a horizontal PLL ("HPLL"). A SRC with a HPLL may be referred to herein as a "line-locked SRC."

Converted output signals from SRCs 20 and 35 are provided to DSP 40, which in FIG. 1 may be embodied as a PIP processor. DSP 40 digitally processes the converted signals (e.g., to enable a PIP function), and provides its processed output signals in the orthogonal pixel domain to another SRC, e.g., a third SRC shown as inverse-SRC 45 in the exemplary embodiment shown in FIG. 1, which performs an inverse sample rate conversion operation thereon. In particular, inverse-SRC 45 performs an inverse sample rate conversion operation to convert signals from the orthogonal pixel domain to the non-orthogonal pixel domain.

In accordance with an aspect of the invention, when performing the inverse sample rate conversion operation, inverse-SRC 45 utilizes information provided from SRC 20, e.g., as indicated by control or timing signal CTRL shown in FIG. 1. By utilizing such information, only one clock is required for data transfer, which helps eliminate the possibility of undesired picture artifacts that commonly result from the use of multiple clocks. Moreover, using information from SRC 20 eliminates the need for a separate PLL in the inverse-SRC 45 and thus, reduces circuitry requirements while preventing further degradation of the system transient response time and noise immunity.

Converted output signals from inverse-SRC 45 are provided to DSP 50 which performs a digital signal processing operation thereon. The processed output signals from DSP 50 are then provided to DAC 55 which converts the processed signals to an analog format, and provides its analog output signals to a display driver of the video system.

Figure 2:
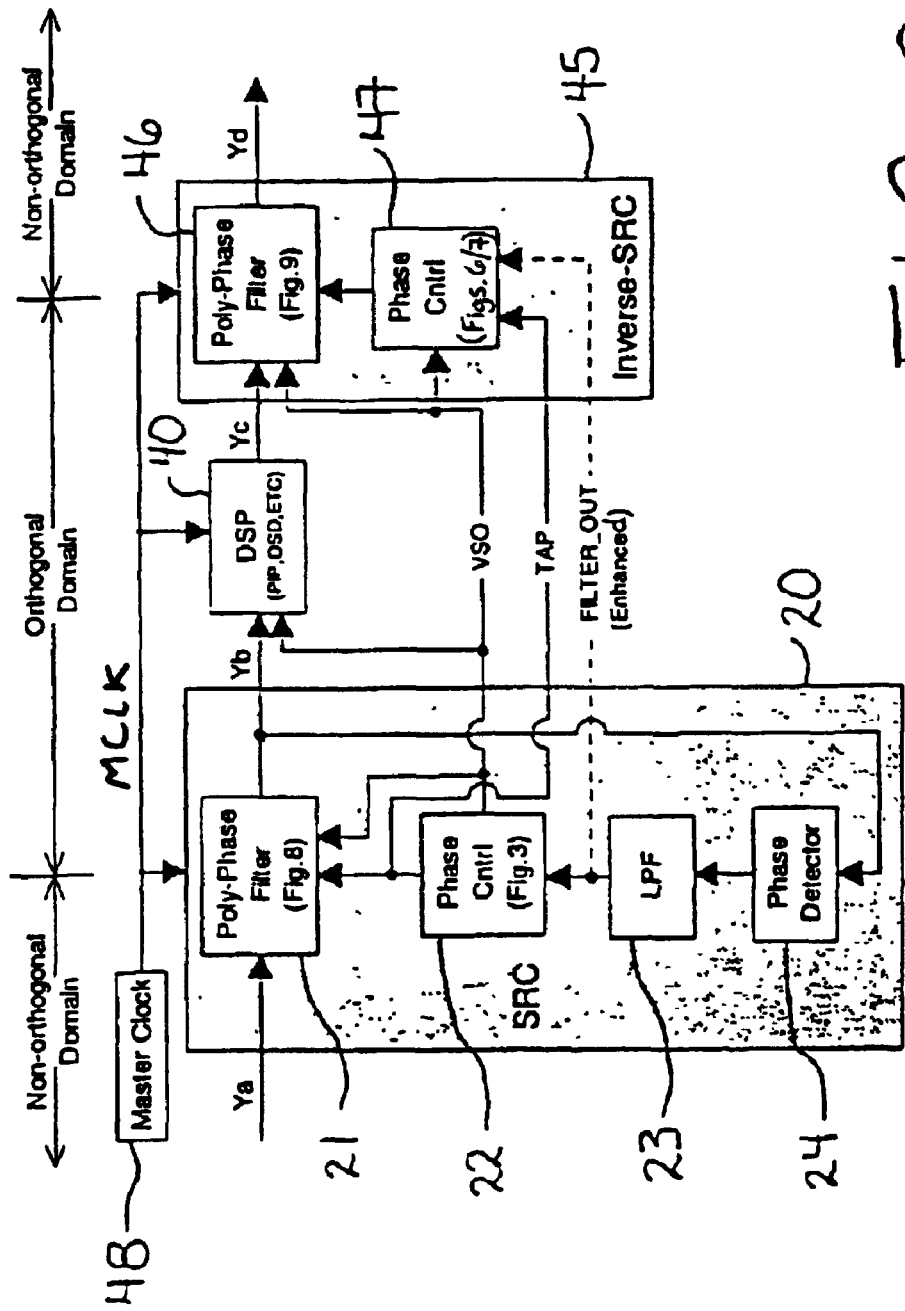
FIG. 2 illustrates further exemplary details of the SRC and the inverse-SRC of FIG. 1.

Referring now to FIG. 2, further exemplary details of SRC 20 and inverse-SRC 45 of FIG. 1 are shown. In FIG. 2, SRC 20 is a line-locked SRC which converts non-orthogonal samples (Ya) into orthogonal samples (Yb) in order to simplify PIP and/or OSD processing. DSP 40 receives and processes the orthogonal samples (Yb), and provides processed samples (Yc) to inverse-SRC 45. For purposes of example and explanation, FIG. 2 illustrates only one input channel to DSP 40. However, for applications such as PIP, DSP 40 would typically receive inputs from an SRC of another channel (not shown). DSP 40 may also be embodied as a processor for enabling other functions, such as frame comb filtering. Inverse-SRC 45 converts the processed samples (Yc) back to non-orthogonal samples (Yd) in the original non-orthogonal domain. A master clock signal MCLK provides clock signals to SRC 20, DSP 40 and inverse-SRC 45. According to an exemplary embodiment, the frequency of master clock signal MCLK is 18 MHz.

As shown in FIG. 2, SRC 20 comprises a poly-phase filter 21 within a HPLL including a phase controller 22, a low pass filter ("LPF") 23 and a phase detector 24. Inverse-SRC 45 comprises a poly-phase filter 46 and a phase controller 47. As previously indicated herein, inverse-SRC 45 utilizes information from SRC 20, and thereby eliminates the need for a separate PLL within inverse-SRC 45. Accordingly, a simpler design is achieved which improves video system performance and reduces cost.

In operation, the SRC phase controller 22 receives a Filter_Out signal from LPF 23, and based thereon generates two control signals. In particular, SRC phase controller 22 generates a Tap signal, and a Valid SRC Out ("VSO") signal. As will be described later herein, the Tap signal is a phase control signal and controls a look-up table of multiplier coefficients in SRC poly-phase filter 21, while the VSO signal is a control, or timing, signal that controls data transfer in the orthogonal domain. That is, the VSO signal allows the orthogonal domain to utilize the same clock as the non-orthogonal domain, even though the two domains have different sample rates.

According to an exemplary embodiment, the non-orthogonal domain has a fixed sample rate of 18 MHz, and the orthogonal domain has 858 samples per line. Thus, if the applicable video signal has a nominal horizontal line frequency, Fh=15,734.26 kHz, the orthogonal domain sample rate is: 858×Fh=13.5 MHz. Accordingly, the conversion ratio of SRC 20 is: 13.5/18=¾, which means SRC 20 should produce 3 output samples for every 4 input samples. In order for the orthogonal domain to use the same clock as the non-orthogonal domain, signal processing in the orthogonal domain must pause 1 out of every 4 clock cycles.

In this manner, the timing, or control, signal from SRC 20 (e.g., represented by signal VSO in FIG. 2) also operates as an enable signal for data transfer registers in the orthogonal domain and, thus, determines whether data processing is active or paused.

Figure 3:
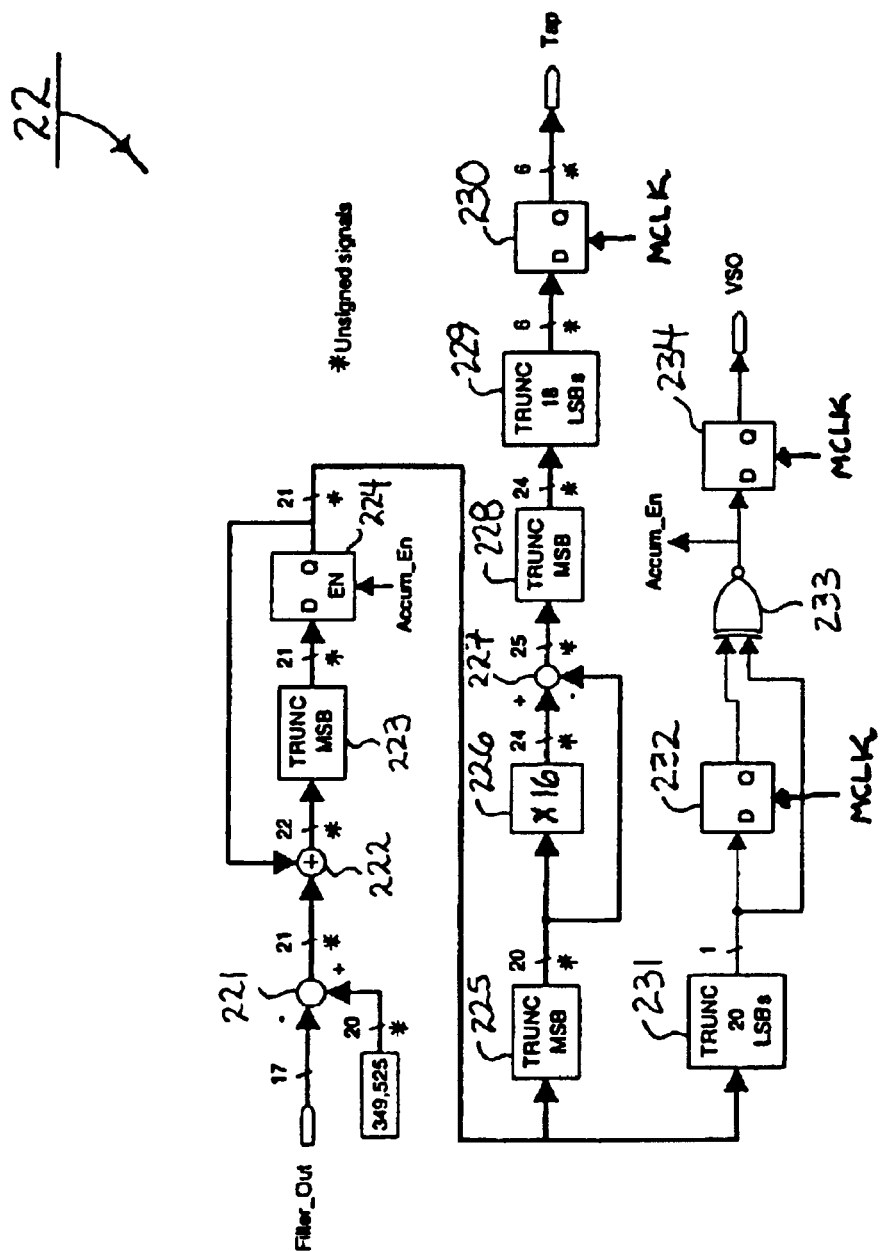
FIG. 3 illustrates further exemplary details of the phase controller of the SRC of FIG. 2.

Referring now to FIG. 3, further exemplary details of SRC phase controller 22 of FIG. 2 are shown. In FIG. 3, the numbers shown above the signal lines represent the number of bits transmitted on the corresponding signal line (i.e., the bit-width of the signal) in the exemplary embodiment. These numbers are not intended to be limiting in any manner. That is, other systems constructed in accordance with principles of the invention described herein may utilize signals involving other numbers of bits or bit-widths. Also in FIG. 3, the signal lines having an asterisk ("*") adjacent thereto represent unsigned signals (i.e., signals having neither a positive nor negative indicator).

In FIG. 3, the Filter_Out signal is subtracted from a fixed bias of 349,525 at subtracter 221. The result of this subtraction operation is then applied to an accumulator whose output is periodically updated. In particular, the accumulator comprises an adder 222, a truncation block 223 and a D-type flip-flop 224. Adder 222 adds an output value from subtracter 221 to a feedback signal value provided from D-type flip-flop 224. Truncation block 223 truncates the most significant bit ("MSB") of an output signal from adder 222, and provides a resulting truncated signal to D-type flip-flop 224. D-type flip-flop 224 generates an output signal (i.e., the "accumulator output") whenever an Accum_En signal is high, and feeds this output signal back to adder 222. In this manner, the accumulator output is updated in accordance with the Accum_En signal.

The Tap signal is derived from the accumulator output. In particular, the accumulator output is applied to a truncation block 225 which truncates the MSB of the accumulator output to generate a truncated signal. A multiplier 226 and a subtracter 227 both receive the truncated signal from truncation block 225. Multiplier 226 multiplies the truncated signal by 16 and provides a resulting multiplied signal to subtracter 227. Subtracter 227 subtracts the truncated signal provided by truncation block 225 from the multiplied signal provided by multiplier 226. The result of this subtraction operation is then applied to a truncation block 228, which truncates the MSB to generate a truncated signal. Another truncation block 229 receives the truncated signal from truncation block 228, and truncates the 18 least significant bits ("LSBs") therefrom to generate another truncated signal. A D-type flip-flop 230 receives the truncated signal from truncation block 229, and is clocked in accordance with master clock signal MCLK (e.g., from block 48 in FIG. 2) to thereby output the Tap signal.

As previously indicated herein, the Tap signal controls a look-up table of multiplier coefficients in SRC poly-phase filter 21. More specifically, the Tap signal value corresponds to a row number in the look-up table of SRC poly-phase filter 21. According to an exemplary embodiment, SRC 20 has 60 phases between input samples, and the look-up table of SRC poly-phase filter 21 includes 60 rows of coefficients. Accordingly, the Tap signal must wrap from 59 back to 0 when the 20 LSBs of the accumulator output (i.e., the 20 bit signal output from truncation block 225) wrap from $2^{20}-1$ back to 0. Therefore, the Tap signal gain must be exactly $60/2^{20}$ (i.e., equal to $15/2^{18}$).

Like the Tap signal, the VSO signal is also derived from the accumulator output. In particular, the accumulator output is applied to a truncation block 231 which truncates the 20 LSBs of the accumulator output to generate a truncated signal. A D-type flip-flop 232 and an exclusive-NOR gate 233 both receive the truncated signal from truncation block 231. Exclusive-NOR gate 233 also receives the output signal from D-type flip-flop 232 in accordance with master clock signal MCLK. The output signal from exclusive-NOR gate 233 represents the Accum_En signal, which is high unless a low-to-high or high-to-low transition occurs in the MSB of the accumulator output. That is, the Accum_En signal is normally high, but goes low for one clock cycle when the 20 LSBs of the accumulator output wrap from a highest value (e.g., $2^{20}-1$) to a lowest value (e.g., 0). A D-type flip-flop 234 receives the Accum_En signal, and is clocked in accordance with master clock signal MCLK to thereby output the VSO signal. In FIG. 3, the Tap and VSO signals are the registered outputs (i.e., provided from clocked DFFs 230 and 234, respectively), where the VSO signal is normally high but goes low for one clock cycle when the Tap signal wraps from its highest value (e.g., 59) to its lowest value (e.g., 0).

Figure 4:
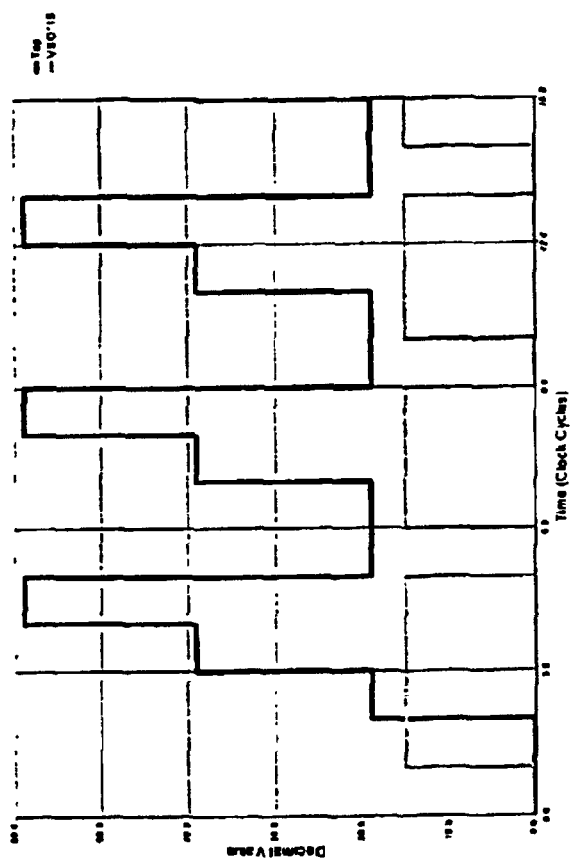
FIG. 4 illustrates exemplary outputs of the phase controller of the SRC of FIG. 3.
Figure 5:
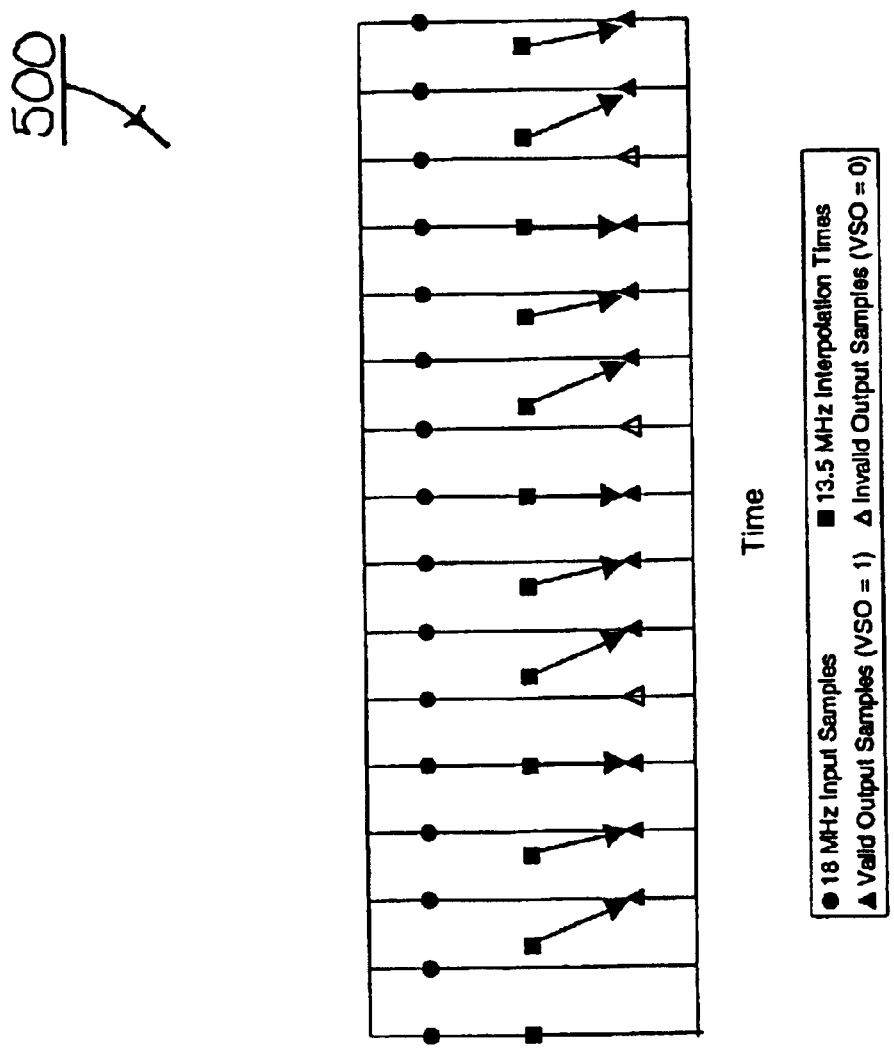
FIG. 5 illustrates an exemplary SRC function.

When the horizontal line frequency input to SRC 20 is nominal (e.g., 15,734.26 kHz), the steady-state value of the Filter_Out signal is 0. Accordingly, the accumulator output will increment by 349,525 on each 18 MHz clock cycle where the Accum_En signal is high. The resulting Tap and VSO signals are depicted by diagram 400 in FIG. 4. That is, FIG. 4 illustrates examples of the Tap and VSO signals when the Filter_Out signal is 0. Note that in FIG. 4 the VSO signal has been multiplied by 15 to facilitate its display. In FIG. 4, ignoring the first two clock cycles (delay from input to output), the VSO signal is high, and the Tap signal changes three out of four 18 MHz clock cycles. The orthogonal domain processing is enabled when the VSO signal is high, and disabled when the VSO signal is low. Therefore, data samples corresponding to clock cycles when the VSO signal is high are valid samples, and data samples corresponding to clock cycles when the VSO signal is low are invalid samples. This distinction between valid and invalid data samples is depicted by diagram 500 in FIG. 5. In FIG. 5, there are 60 phases between input data samples. The phase of interpolated values, relative to the pertinent input samples, corresponds to the Tap signal value (e.g., 19, 39, 59, pause, 19, 39, 59 . . . ). The phase increments by 20, or ⅓ (i.e., $20/60$) of the period between input samples. This results in an output sample period that is ⅘ times the input sample period.

In cases where the horizontal line frequency is less than nominal (e.g., less than 15,734.26 kHz), the Filter-Out signal is positive, the accumulator input (i.e., the input to adder 222 in FIG. 3) decreases, and (on average) there are more than three out of four valid output samples from SRC 20. Conversely, when the horizontal line frequency is greater than nominal (e.g., greater than 15,734.26 kHz), the Filter_Out signal is negative, the accumulator input increases, and (on average) there are less than three out of four valid output samples from SRC 20.

In the exemplary embodiment, inverse-SRC 45 converts orthogonal input pixel samples back to the 18 MHz non-orthogonal domain. Accordingly, inverse-SRC 45 must produce a valid output sample on each 18 MHz clock cycle, even though the input samples are invalid on some clock cycles (i.e., when processing in the orthogonal domain is paused—see FIG. 5). As a result, inverse-SRC 45 must interpolate between valid input samples, and extrapolate based on previous or past samples when an invalid input sample is encountered. In this manner, the VSO signal generated by SRC 20 serves at least two distinct purposes for inverse-SRC 45. First, the VSO signal controls data transfer in the orthogonal domain (i.e., inputs to poly-phase filter 46 of inverse-SRC 45—see FIG. 2), and thereby prevents invalid samples from entering poly-phase filter 46. Secondly, the VSO signal is used by phase controller 47 of inverse-SRC 45 to adjust the phase so that interpolation and extrapolation occur at proper times.

Figure 6:
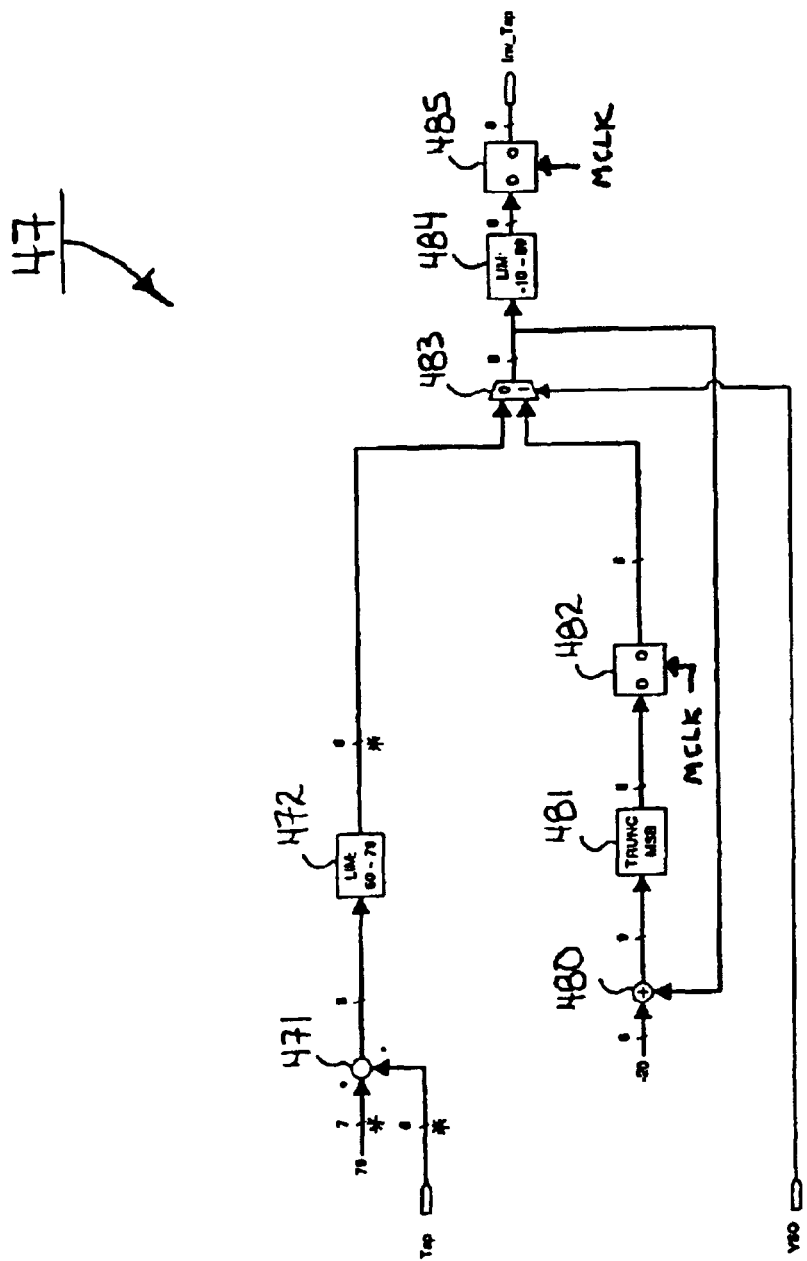
FIG. 6 illustrates further exemplary details of a basic version of the phase controller of the inverse-SRC of FIG. 2.

Referring to FIG. 6, further exemplary details of a basic version of phase controller 47 of inverse-SRC 45 of FIG. 2 are shown. In FIG. 6, the numbers shown above the signal lines represent the number of bits transmitted on the corresponding signal line in the exemplary embodiment. These numbers are not intended to be limiting in any manner. Also in FIG. 6, the signal lines having an asterisk ("*") adjacent thereto represent unsigned signals (i.e., signals having neither a positive nor negative indicator).

In FIG. 6, the Tap signal is subtracted from a fixed value of 79 at a subtracter 471. The result of this subtraction operation is then applied to a limiter 472 which, based on its input, generates an output signal having a value limited from 60 to 79. A multiplexer 483 receives the output signal from limiter 472, and also receives an input signal from a second signal path. This signal path comprises an adder 480, a truncation block 481 and a D-type flip-flop 482. Adder 480 adds a fixed value of −20 to an output signal of multiplexer 483. The result of this addition operation is applied to truncation block 481 which truncates the MSB therefrom to generate a truncated signal. D-type flip-flop 482 receives the truncated signal from truncation block 481, and is clocked in accordance with master clock signal MCLK (e.g., from block 48 in FIG. 2) to thereby provide the other input signal to multiplexer 483. Multiplexer 483 provides its output signal in dependence upon the logic state of the VSO signal. In particular, multiplexer 483 allows its upper input (i.e., output signal from limiter 472) to pass when the VSO signal is low, and allows its lower input (i.e., output signal from D-type flip-flop 482) to pass when the VSO signal is high. A limiter 484 receives the output signal from multiplexer 483, and based thereon generates an output signal having a value limited from −10 to 89. A D-type flip-flop 485 receives the output signal from limiter 484, and is clocked in accordance with master clock signal MCLK to thereby output an Inv_Tap signal.

The Inv_Tap signal controls a look-up table of multiplier coefficients in poly-phase filter 46 of inverse-SRC 45. Inverse-SRC 45 has 80 phases between input samples, which for nominal conditions results in the same time resolution as 60 phases between input samples for SRC 20. In order to facilitate extrapolation, the range of possible phases for inverse-SRC 45 is extended to −10 to 89. In FIG. 6, the Inv-Tap signal is preset to a Tap signal dependent value between 60 and 79 when the VSO signal is low, and decremented by 20 when the VSO signal is high. This provides good performance for horizontal frequencies within a range of at least +/−700 Hz of the nominal frequency. However, significant improvement can be achieved for horizontal frequencies more than +/−100 Hz from the nominal frequency by using an enhanced version of phase controller 47.

Figure 7:
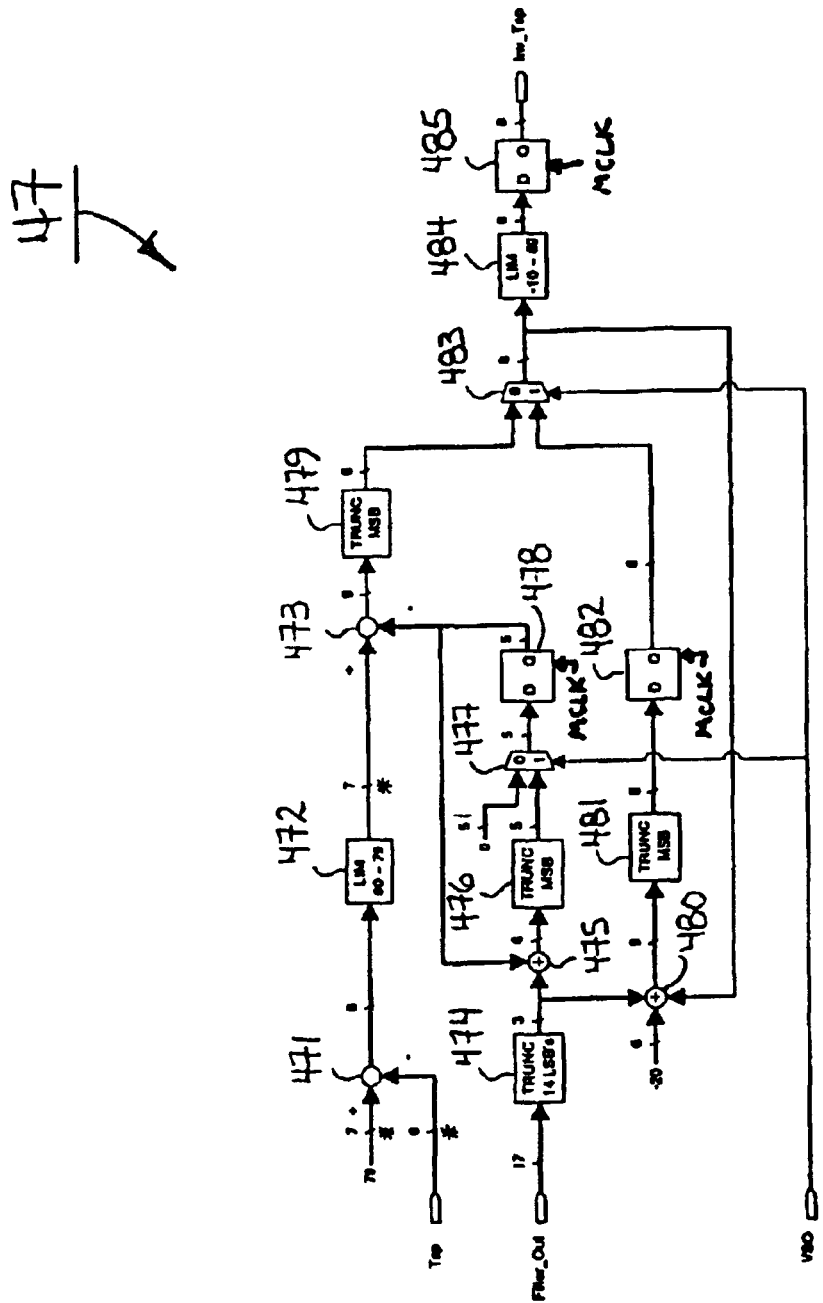
FIG. 7 illustrates further exemplary details of an enhanced version of the phase controller of the inverse-SRC of FIG. 2.

Referring now to FIG. 7, exemplary details of an enhanced version of phase controller 47 of inverse-SRC 45 of FIG. 2 are shown. This enhanced version of phase controller 47 includes a number of elements in common with the basic version of phase controller 47 of FIG. 6. These common elements have the same reference numbers. Like FIG. 6, the numbers shown above the signal lines in FIG. 7 represent the number of bits transmitted on the corresponding signal line (i.e., the signal's bit-width) in the exemplary embodiment. These numbers are not intended to be limiting in any manner. That is, systems using signals having other bit-widths may be constructed in accordance with principles of the invention. Also in FIG. 7, the signal lines having an asterisk ("*") adjacent thereto represent unsigned signals (i.e., signals having neither a positive nor negative indicator).

In FIG. 7, the Tap signal is subtracted from a fixed value of 79 at subtracter 471. The result of this subtraction operation is then applied to limiter 472 which, based on its input, generates an output signal having a value limited from 60 to 79. A subtractor 473 receives the output signal from limiter 472, and subtracts therefrom an output signal from another signal path. This signal path comprises a truncation block 474, an adder 475, a truncation block 476, a multiplexer 477 and a D-type flip-flop 478. Truncation block 474 receives the Filter-Out signal, and truncates therefrom the 14 LSBs to generate a truncated signal. Adder 474 adds the truncated signal from truncation block 474 to the output signal from the signal path. The result of this addition operation is provided to truncation block 476 which truncates therefrom the MSB to generate a truncated signal. Multiplexer 477 receives the truncated signal from truncation block 476 and a signal having a fixed value of 0, and selectively outputs one of these two signals in dependence upon, or in response to, the mutliplexer control signal, e.g., in response to the logic state of the VSO signal. In particular, multiplexer 477 allows its upper input (i.e., signal having value of 0) to pass when the VSO signal is low, and allows its lower input (i.e., truncated signal from truncation block 476) to pass when the VSO signal is high. D-type flip-flop 478 receives the output signal from multiplexer 477, and is clocked in accordance with master clock signal MCLK to thereby provide the output signal of the signal path. As indicated in FIG. 7, this output signal is fed back to adder 475, and is also provided to subtractor 473.

A truncation block 479 receives an output signal from subtractor 473, and truncates therefrom the MSB to thereby generate a truncated signal. Multiplexer 483 receives the truncated signal from truncation block 479, and also receives an input signal from another signal path. This signal path comprises adder 480, truncation block 481 and D-type flip-flop 482, which were also included in the basic version of phase controller 47 shown in FIG. 6. Adder 480 adds a fixed value of −20, an output signal of multiplexer 483, and the truncated signal provided from truncation block 474. The result of this addition operation is applied to truncation block 481 which truncates the MSB therefrom to generate a truncated signal. D-type flip-flop 482 receives the truncated signal from truncation block 481, and is clocked in accordance with master clock signal MCLK to thereby provide the other input signal to multiplexer 483. Multiplexer 483 provides its output signal in dependence upon the logic state of the VSO signal. In particular, multiplexer 483 allows its upper input (i.e., truncated signal from truncation block 479) to pass when the VSO signal is low, and allows its lower input (i.e., output signal from D-type flip-flop 482) to pass when the VSO signal is high. Limiter 484 receives the output signal from multiplexer 483, and based thereon generates an output signal having a value limited from −10 to 89. D-type flip-flop 485 receives the output signal from limiter 484, and is clocked in accordance with master clock signal MCLK to thereby output the Inv_Tap signal, which controls a look-up table of multiplier coefficients in poly-phase filter 46 of inverse-SRC 45.

Another exememplary embodiment of phase controller 47 is shown in FIG. 7. The embodiment shown in FIG. 7 uses inter-sample frequency compensation where: (i) the Inv_Tap signal preset, selected by multiplexer 483 when the VSO signal is low, is adjusted by the accumulated value of the 3 MSBs of the Filter_Out signal since the last time the VSO signal was low; and (ii) the 3 MSBs of the Filter_Out signal are used to adjust the rate at which the Inv_Tap signal is decremented when the VSO signal is high.

Figure 8:
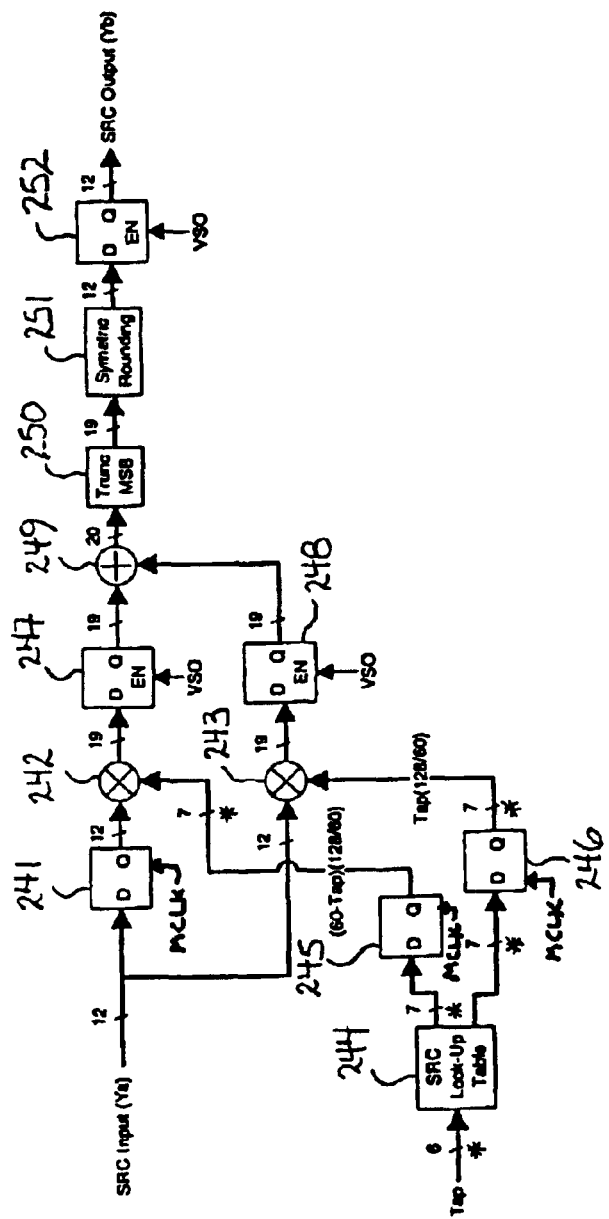
FIG. 8 illustrates further exemplary details of the polyphase filter of the SRC of FIG. 2.

Referring now to FIG. 8, further exemplary details of poly-phase filter 21 of SRC 20 in FIG. 2 are shown. The numbers shown above the signal lines in FIG. 8 represent the number of bits transmitted on the corresponding signal line in the exemplary embodiment. These numbers are not intended to be limiting in any manner. Also in FIG. 8, the signal lines having an asterisk ("*") adjacent thereto represent unsigned signals (i.e., signals having neither a positive nor negative indicator).

In FIG. 8, a non-orthogonal domain SRC input signal (Ya) is provided to a D-type flip-flop 241, which is clocked in accordance with master clock signal MCLK to thereby provide an output signal to a multiplier 242. The SRC input signal (Ya) is also provided to a multiplier 243. An SRC look-up table 244 receives the Tap signal, and based thereon, provides two separate output signals. The first output signal from SRC look-up table 244 is provided to a D-type flip-flop 245, which is clocked in accordance with master clock signal MCLK to thereby provide an output signal to multiplier 242. As indicated in FIG. 8, the output signal from D-type flip-flop 245 has a value equal to (60—the Tap signal value) times (128/60). The second output signal from SRC look-up table 244 is provided to another D-type flip-flop 246, which is clocked in accordance with master clock signal MCLK to thereby provide an output signal to multiplier 243. As indicated in FIG. 8, the output signal from D-type flip-flop 246 has a value equal to the Tap signal value times (128/60).

Multiplier 242 multiplies the output signal from D-type flip-flop 241 with the output signal from D-type flip-flop 245 to thereby generate a multiplied signal. A D-type flip-flop 247 receives the multiplied signal from multiplier 242, and is clocked in accordance with the VSO signal to thereby provide an output signal. Multiplier 243 multiplies the SRC input signal (Ya) with the output signal from D-type flip-flop 246 to thereby generate a multiplied signal. A D-type flip-flop 248 receives the multiplied signal from multiplier 243, and is clocked in accordance with the VSO signal to thereby provide an output signal. An adder 249 adds the output signals from D-type flip-flops 247 and 248. The result of this addition operation is provided to a truncation block 250, which truncates the MSB therefrom to generate a truncated signal. A symmetric rounding block 251 receives the truncated signal from truncation block 250, and performs a symmetric rounding operation thereon to generate a rounded output signal. A D-type flip-flop 252 receives the rounded output signal from symmetric rounding block 251, and is clocked in accordance with the VSO signal to thereby provide an orthogonal domain SRC output signal (Yb).

Figure 9:
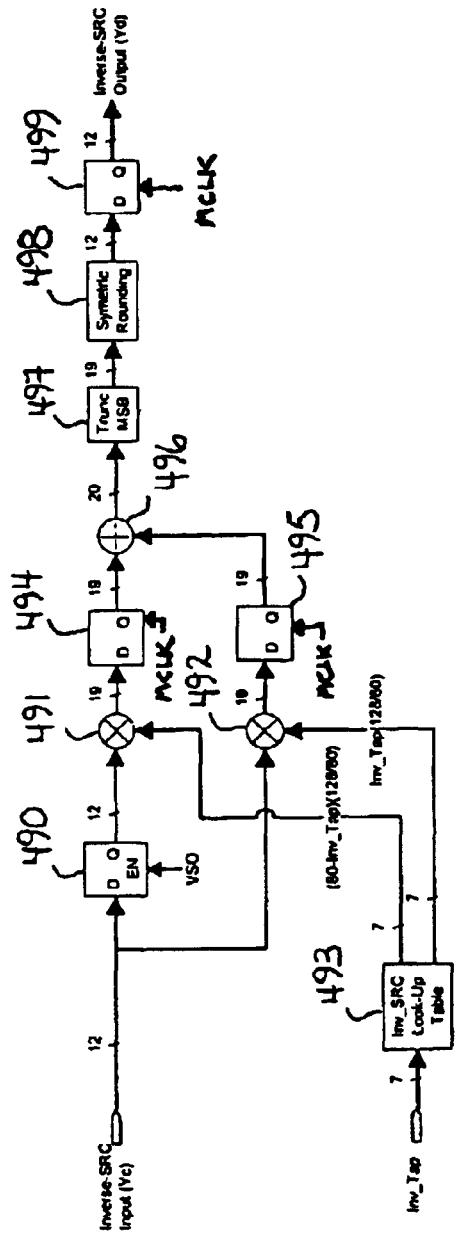
FIG. 9 illustrates further exemplary details of the polyphase filter of the inverse-SRC of FIG. 2.

Referring now to FIG. 9, further exemplary details of poly-phase filter 46 of SRC 45 in FIG. 2 are shown. The numbers shown above the signal lines in FIG. 9 represent the number of bits transmitted on the corresponding signal line in the exemplary embodiment. These numbers are not intended to be limiting in any manner.

In FIG. 9, an orthogonal domain inverse-SRC input signal (Yc) is provided to a D-type flip-flop 490, which is clocked in accordance with the VSO signal to thereby provide an output signal to a multiplier 491. The inverse-SRC input signal (Yc) is also provided to a multiplier 492. An inverse SRC look-up table 493 receives the Inv_Tap signal, and based thereon, provides two separate output signals. The first output signal from inverse-SRC look-up table 493 is provided to multiplier 491. As indicated in FIG. 9, this first output signal from inverse-SRC look-up table 493 has a value equal to (80—the Inv_Tap signal value) times (128/80). The second output signal from inverse-SRC look-up table 493 is provided to multiplier 492. As indicated in FIG. 9, this second output signal from inverse-SRC look-up table has a value equal to the Inv_Tap signal value times (128/80). Multiplier 491 multiplies the output signal from D-type flip-flop 490 with the first output signal from inverse-SRC look-up table 493 to thereby generate a multiplied signal. A D-type flip-flop 494 receives the multiplied signal from multiplier 491, and is clocked in accordance with master clock signal MCLK to thereby provide an output signal. Multiplier 492 multiplies the inverse-SRC input signal (Yc) with the second output signal from inverse-SRC look-up table 493 to thereby generate a multiplied signal. A D-type flip-flop 495 receives the multiplied signal from multiplier 492, and is clocked in accordance with master clock signal MCLK to thereby provide an output signal. An adder 496 adds the output signals from D-type flip-flops 494 and 495. The result of this addition operation is provided to a truncation block 497, which truncates the MSB therefrom to generate a truncated signal. A symmetric rounding block 498 receives the truncated signal from truncation block 497, and performs a symmetric rounding operation thereon to generate a rounded output signal. A D-type flip-flop 499 receives the rounded output signal from symmetric rounding block 498, and is clocked in accordance with master clock signal MCLK to thereby provide a non-orthogonal domain inverse-SRC output signal (Yd).

It is noted that poly-phase filters 21 and 46 described above in conjunction with FIGS. 8 and 9 are simplified examples in that they each include only two multipliers. Variations of these embodiments may of course be utilized in accordance with the principles of the present invention. The embodiments of FIGS. 8 and 9 are, however, useful in illustrating how the VSO signal controls the data transfer on the output side of SRC 20 and the input side of inverse-SRC 45. It is in this manner that the VSO signal also controls the data transfer throughout circuits (e.g., DSP 40) connected between SRC 20 and inverse-SRC 45.

Referring now to FIGS. 10 through 15, various sets of exemplary simulation results according to the present invention are shown. In particular, FIGS. 10 through 15 graphically illustrate inputs to SRC 20 (i.e., Ya) and outputs from inverse-SRC 45 (i.e., Yd) of FIG. 2 under various conditions using the enhanced version of phase controller 47 of inverse-SRC 45 (see FIG. 7). These simulations were run using the simplified poly-phase filters 21 and 46 shown in FIGS. 8 and 9, respectively, with just a wire connecting the output of SRC 20 to the input of inverse-SRC 45.

Figure 10:
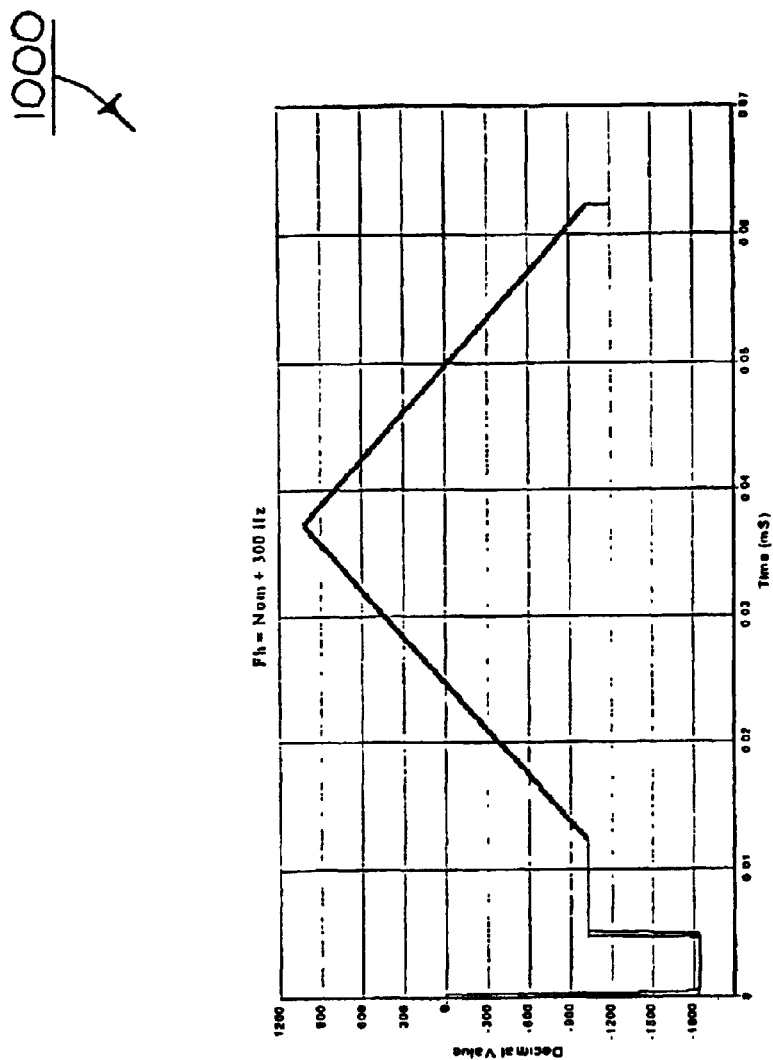
FIGS. 10 and 11 illustrate a first set of exemplary simulation results according to the present invention.
Figure 11:
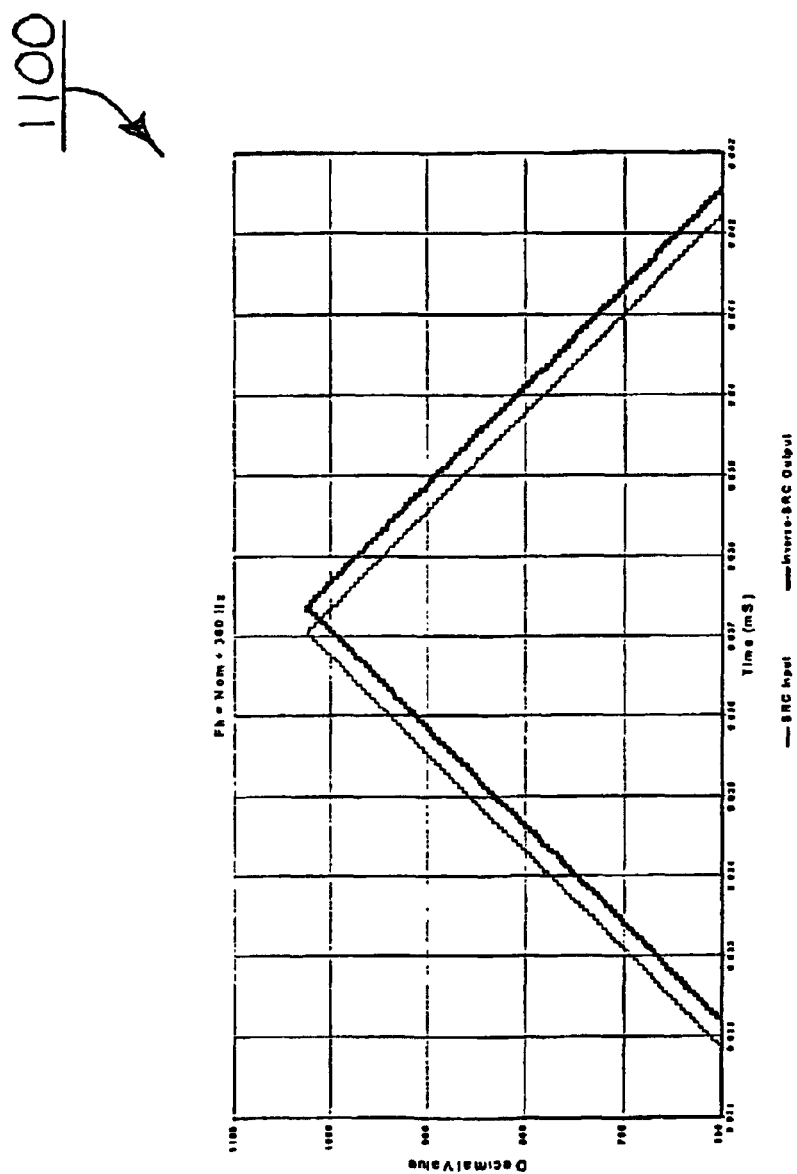

FIGS. 10 and 11 illustrate a first set of exemplary simulation results according to the present invention where the horizontal line frequency Fh is equal to the nominal line frequency (i.e., 15,734.26 kHz) plus 300 Hz. As shown in graph 1000 of FIG. 10, the input to SRC 20 and the output from inverse-SRC 45 are substantially identical during the indicated time period. In particular, the time period shown in FIG. 10 represents one complete horizontal line after the PLL of SRC 20 has reached a steady-state condition. The graph 1100 of FIG. 11 is a zoomed-in view of the waveform peak in FIG. 10A. In FIG. 11, the difference between the input to SRC 20 and the output from inverse-SRC 45 is attributable to signal propagation delay through the circuitry.

Figure 12:
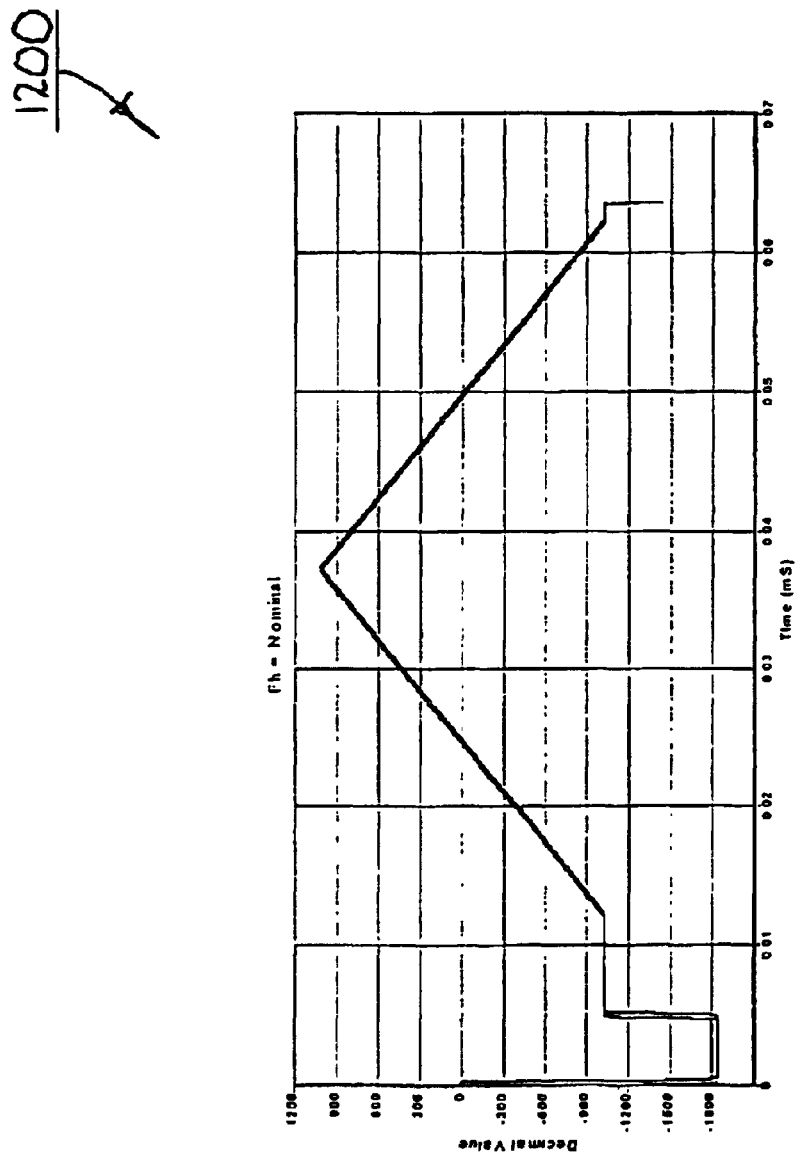
FIGS. 12 and 13 illustrate a second set of exemplary simulation results according to the present invention.
Figure 13:
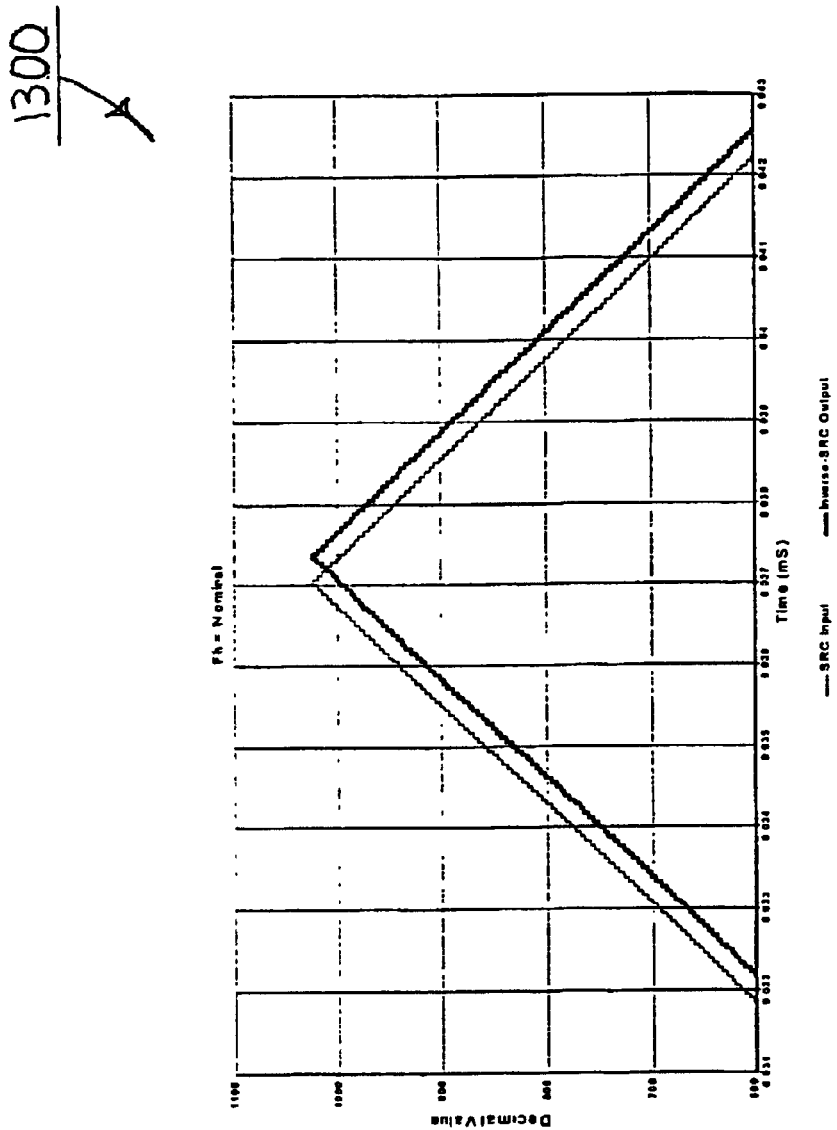

FIGS. 12 and 13 illustrate a second set of exemplary simulation results according to the present invention where the horizontal line frequency Fh is equal to the nominal line frequency (i.e., 15,734.26 kHz). As shown in graph 1200 of FIG. 12, the input to SRC 20 and the output from inverse-SRC 45 are substantially identical during the indicated time period. Like FIG. 10, the time period shown in FIG. 12 represents one complete horizontal line after the PLL of SRC 20 has reached a steady-state condition. The graph 1300 of FIG. 13 is a zoomed-in view of the waveform peak in FIG. 12. Like FIG. 11, the difference between the input to SRC 20 and the output from inverse-SRC 45 in FIG. 13 is attributable to signal propagation delay through the circuitry.

Figure 14:
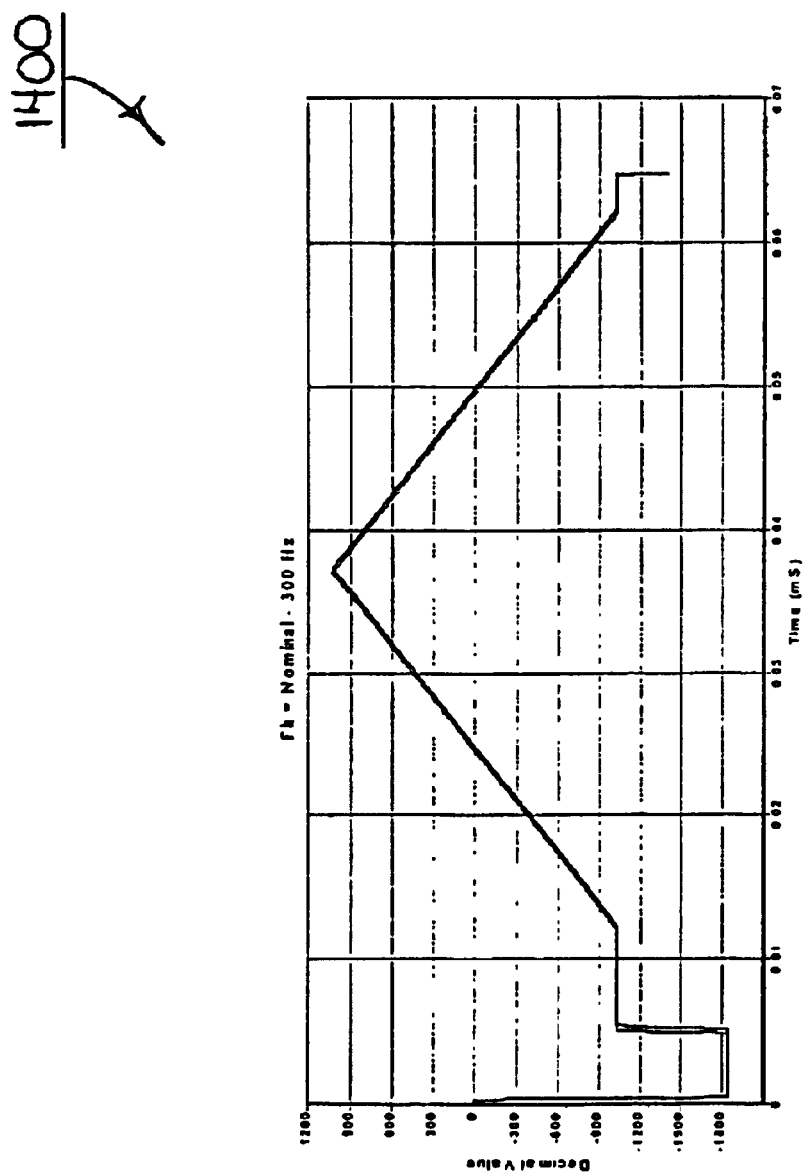
FIGS. 14 and 15 illustrate a third set of exemplary simulation results according to the present invention.
Figure 15:
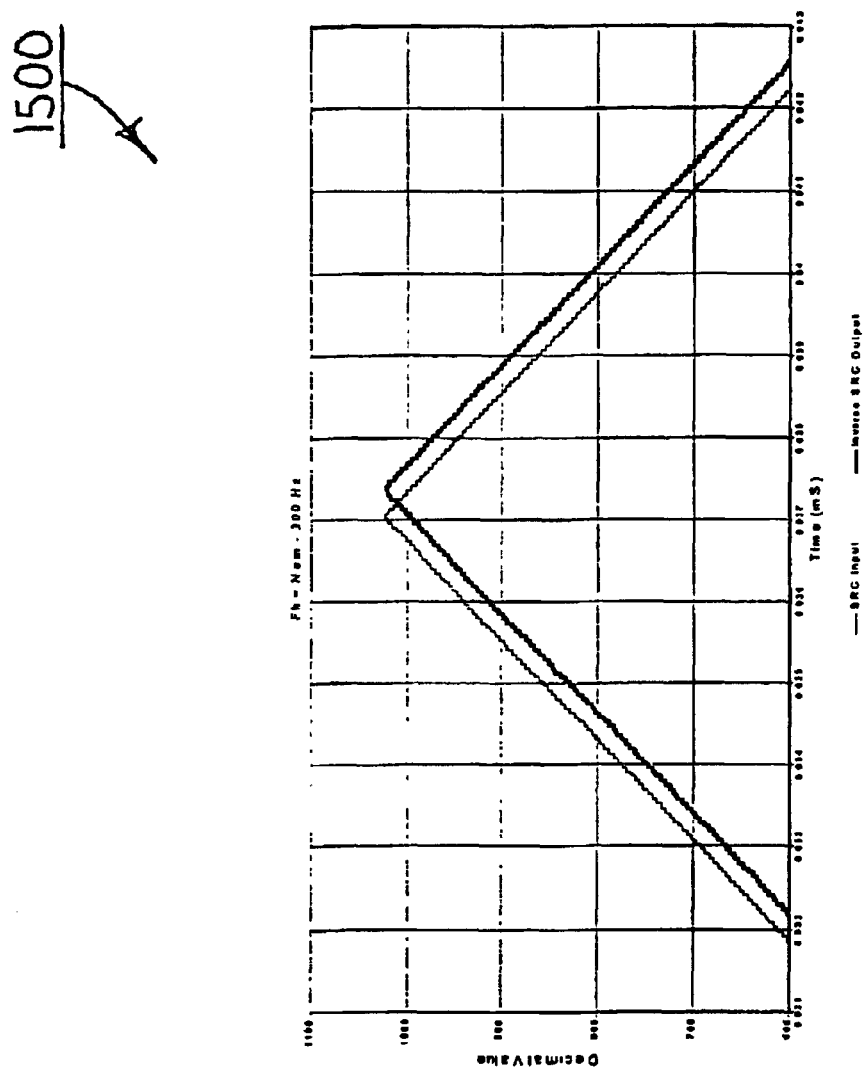

FIGS. 14 and 15 illustrate a third set of exemplary simulation results according to the present invention where the horizontal line frequency Fh is equal to the nominal line frequency (i.e., 15,734.26 kHz) minus 300 Hz. As shown in graph 1400 of FIG. 14, the input to SRC 20 and the output from inverse-SRC 45 are substantially identical during the indicated time period. Like FIGS. 10 and 12, the time period shown in FIG. 14 represents one complete horizontal line after the PLL of SRC 20 has reached a steady-state condition. The graph 1500 of FIG. 15 is a zoomed-in view of the waveform peak in FIG. 14. Like FIGS. 11 and 13, the difference between the input to SRC 20 and the output from inverse-SRC 45 in FIG. 15 is attributable to signal propagation delay through the circuitry.

As described herein, the present invention advantageously provides a video system including an SRC and an inverse-SRC which is controlled by the SRC, thereby enabling the video system to operate on a single clock. By directly controlling the inverse-SRC using information from the PLL of the SRC, the transient recovery interval of the video system is that of only one PLL, and thus is much shorter than other video systems. Moreover, undesired picture artifacts are prevented and less circuitry is required.

The present invention described herein is applicable to various video systems, either with or without display devices. Accordingly, the phrases "video system", "video signal processing system" or "digital video system" as used herein are intended to encompass various types of systems or apparatuses including, but not limited to, television sets or monitors that include a display device, television signal receivers that do not include a display device, and systems or apparatuses such as a set-top box, video cassette recorder (VCR), digital versatile disk (DVD) player, video game box, personal video recorder (PVR) or other video system that may not include a display device.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A video signal processing system, comprising:
   a first sample rate converter for converting video data from a first clock domain to a second clock domain; and
   a second sample rate converter for converting the video data from the second clock domain to the first clock domain in response to a control signal generated by the first sample rate converter.

2. The video signal processing system of claim 1, wherein the first clock domain comprises a non-orthogonal pixel domain and the second clock domain comprises an orthogonal pixel domain, and further comprising a processor for receiving the video data from the sample rate converter in the orthogonal pixel domain, and performing a processing operation thereon wherein the processor controls data transfer between the first sample rate converter and the second sample rate converter in response to the control signal generated by the first sample rate converter.

3. The video signal processing system of claim 2, wherein the processing operation performed by the processor enables a picture-in-picture function.

4. The video signal processing system of claim 3, further comprising a third sample rate converter for converting picture-in-picture data from the non-orthogonal pixel domain to the orthogonal pixel domain, and outputting the picture-in-picture data in the orthogonal pixel domain to the processor.

5. The video signal processing system of claim 1, wherein the second sample rate converter comprises a phase controller for performing frequency compensation in response to the control signal generated by the first sample rate converter.

6. The video signal processing system of claim 1, further comprising a clock signal generator for providing clock signals to the first sample rate converter and the second sample rate converter.

7. The video signal processing system of claim 1, wherein the control signal comprises a phase control signal generated by the first sample rate converter when converting the video data from the orthogonal pixel domain to the non-orthogonal pixel domain.

8. A video signal processing system, comprising:
   sample rate conversion means for converting video data from a non-orthogonal pixel domain to an orthogonal pixel domain;
   inverse sample rate conversion means for converting the video data from the orthogonal pixel domain to the non-orthogonal pixel domain; and
   wherein the inverse sample rate conversion means utilizes a timing signal generated by the sample rate conversion means when converting the video data from the orthogonal pixel domain to the non-orthogonal pixel domain.

9. The digital video system of claim 8, further comprising processing means for receiving the video data from the sample rate conversion means in the orthogonal pixel domain, and performing a processing operation thereon.

10. The digital video system of claim 9, wherein the processing means utilizes the timing signal generated by the sample rate conversion means to control data transfer between the sample rate converter and the inverse sample rate conversion means.

11. The digital video system of claim 9, wherein the processing operation performed by the processing means enables a picture-in-picture function.

12. The digital video system of claim 11, further comprising second sample rate conversion means for converting picture-in-picture data from the non-orthogonal pixel domain to the orthogonal pixel domain, and outputting the picture-in-picture data in the orthogonal pixel domain to the processing means.

13. The digital video system of claim 8, wherein the inverse sample rate conversion means comprises phase control means for performing frequency compensation in dependence upon the timing signal generated by the sample rate conversion means.

14. The digital video system of claim 8, further comprising clock means for providing clock signals to the sample rate conversion means and the inverse sample rate conversion means.

15. The digital video system of claim 8, wherein the inverse sample rate conversion means utilizes a phase control signal generated by the sample rate conversion means when converting the video data from the orthogonal pixel domain to the non-orthogonal pixel domain.

16. A method for processing data in a digital video system, comprising steps of:
   using a sample rate converter to convert video data from a non-orthogonal pixel domain to an orthogonal pixel domain;
   using an inverse sample rate converter to convert the video data from the orthogonal pixel domain to the non-orthogonal pixel domain; and
   wherein the inverse sample rate converter utilizes a timing signal generated by the sample rate converter when converting the video data from the orthogonal pixel domain to the non-orthogonal pixel domain.

17. The method of claim 16, further comprised of performing a processing operation on the video data in the orthogonal pixel domain.

18. The method of claim 17, wherein the processing operation enables a picture-in-picture function.

19. The method of claim 18, further comprised of using a second sample rate converter to convert picture-in-picture data from the non-orthogonal pixel domain to the orthogonal pixel domain.

20. The method of claim 16, further comprised of using the inverse sample rate converter to perform frequency compensation in dependence upon the timing signal generated by the sample rate converter.

21. The method of claim 16, further comprised of using a clock to provide clock signals to the sample rate converter and the inverse sample rate converter.

22. The method of claim 16, further comprised of the inverse sample rate converter utilizing a phase control signal generated by the sample rate converter when converting the video data from the orthogonal pixel domain to the non-orthogonal pixel domain.

\* \* \* \* \*